United States Patent [19]

Smith

[11] Patent Number: 5,261,782

[45] Date of Patent: Nov. 16, 1993

[54] CONTINUOUS STACKING APPARATUS

[75] Inventor: Brenton L. Smith, Alexandria, Minn.

[73] Assignee: Brenton Engineering Co., Alexandria, Minn.

[21] Appl. No.: 693,792

[22] Filed: Apr. 29, 1991

[51] Int. Cl.⁵ .............................................. B65G 57/30
[52] U.S. Cl. .................................................. 414/795.3
[58] Field of Search .............. 414/790.3, 795.3, 795, 414/794.9

[56] References Cited

U.S. PATENT DOCUMENTS 4,324,520 4/1982 Kjellberg ........................ 414/797.8

FOREIGN PATENT DOCUMENTS 06711014 10/1964 Italy .................................. 414/795.3
0423649 4/1974 U.S.S.R. ........................... 414/795.3
2233625 1/1991 United Kingdom ............ 414/795.3

Primary Examiner—David H. Bollinger
Assistant Examiner—Carol Wallace
Attorney, Agent, or Firm—Herman H. Bains

[57] ABSTRACT

A stacker apparatus for continuously stacking articles into vertical stacks for packaging into a case includes a pair of stacking plate assemblies which are mounted on a support frame for horizontal and vertical movement relative thereto. A synchronized cam drive system continuously and successively reciprocates the stacking plate assemblies through an elliptical path of travel to continuously upstack articles fed to the apparatus. The specific operational sequence of the apparatus and its construction provides a built-in surge release and obviates the need for definite shear point.

11 Claims, 5 Drawing Sheets

5,261,782

CONTINUOUS STACKING APPARATUS

FIELD OF THE INVENTION

This invention relates to a stacking apparatus and more particular to a stacking apparatus for continuously stacking articles such as cartons.

BACKGROUND OF THE INVENTION

There are various types of commercial stacker apparatus which stack cartons and other dimensionally stable packaged products in groups for loading into larger cases. The cartons or boxes to be stacked are typically delivered to the stacker apparatus by conveyors.

In the basic upstacker apparatus, the cartons delivered by the conveyor to the stacker apparatus are received and pushed upwardly during the upward stroke of a vertically reciprocating stacking plate. Shiftable catch plates support the cartons during the downward stroke of the stacker plate and permit vertical stacking. However, the basic upstacker apparatus is limited in its speed of operation, and, when operated at its higher speeds tends to be rough in the handling of the cartons.

The progressive tier stacker apparatus is considered to be a high speed stacker and moves a relatively large number of cartons through the stacking chamber during the upward stroke of the vertically reciprocating stacking plate. Catch plates support the cartons during the downward stroke of the stacking plate. An accumulation pusher pushes a standard product length (usually four cartons) from each horizontal row of the carton stack into a case during loading. However, the progressive tier stacker apparatus is also not very gentle with the product during stacking and must be preloaded.

SUMMARY OF THE INVENTION

It is an object of this invention to provide a novel high speed reliable continuous stacker apparatus including a pair of reciprocating stacking plates moveable through an elliptical path of travel to successively and sequentially guide product into the stacking chamber to permit continuous product stacking without upstream product pressure.

Another object of this invention is to provide a continuous stacker apparatus in which the product delivered to the stacking chamber is first accelerated and then decelerated into a stacking position to provide smooth operation at high speeds.

Another object of this invention is to provide a novel continuous high speed stacker apparatus, of simple and inexpensive construction, which is compact and occupies less floor space than conventional prior art stacker apparatus.

The present stacker apparatus includes a pair of stacking plate assemblies which are mounted for horizontal reciprocating movement between an upstream stacking position and a downstream position. The stacking plate assemblies are also mounted for vertical reciprocation between an elevated stacking position and a lowered position. Horizontal and vertical reciprocation of the stacking plate assemblies are synchronized by timing cams so that the overall continuous movement of the stacking plate assemblies is that of a walking beam. More specifically, the stacking plate assemblies are moved through an elliptical path of travel during the stacking operation. This unique design and operation of the stacking apparatus provides a consistent stacking shear point and a built-in surge release.

FIGURES OF THE DRAWING

FIG. 1 is a side elevation view of one portion of the novel stacker apparatus in which most of the supporting frame structure is omitted to better illustrate the underlying operative components, FIG. 2 is a side elevation view of the remaining portion of the stacker apparatus illustrating certain drive components of the apparatus, FIG. 3 is cross sectional view taken approximately along line 3—3 of FIG. 1 and looking in the direction of the arrows and, FIG. 4 is a plan view of the drive system for the stacking plate assemblies.

FIG. 5 is a diagrammatic side view illustrating the path of travel of the stacking plate assemblies and the manner in which the stacking plate assemblies interact with the product being stacked.

DESCRIPTION OF THE PREFERRED EMBODIMENT

Figure 1:
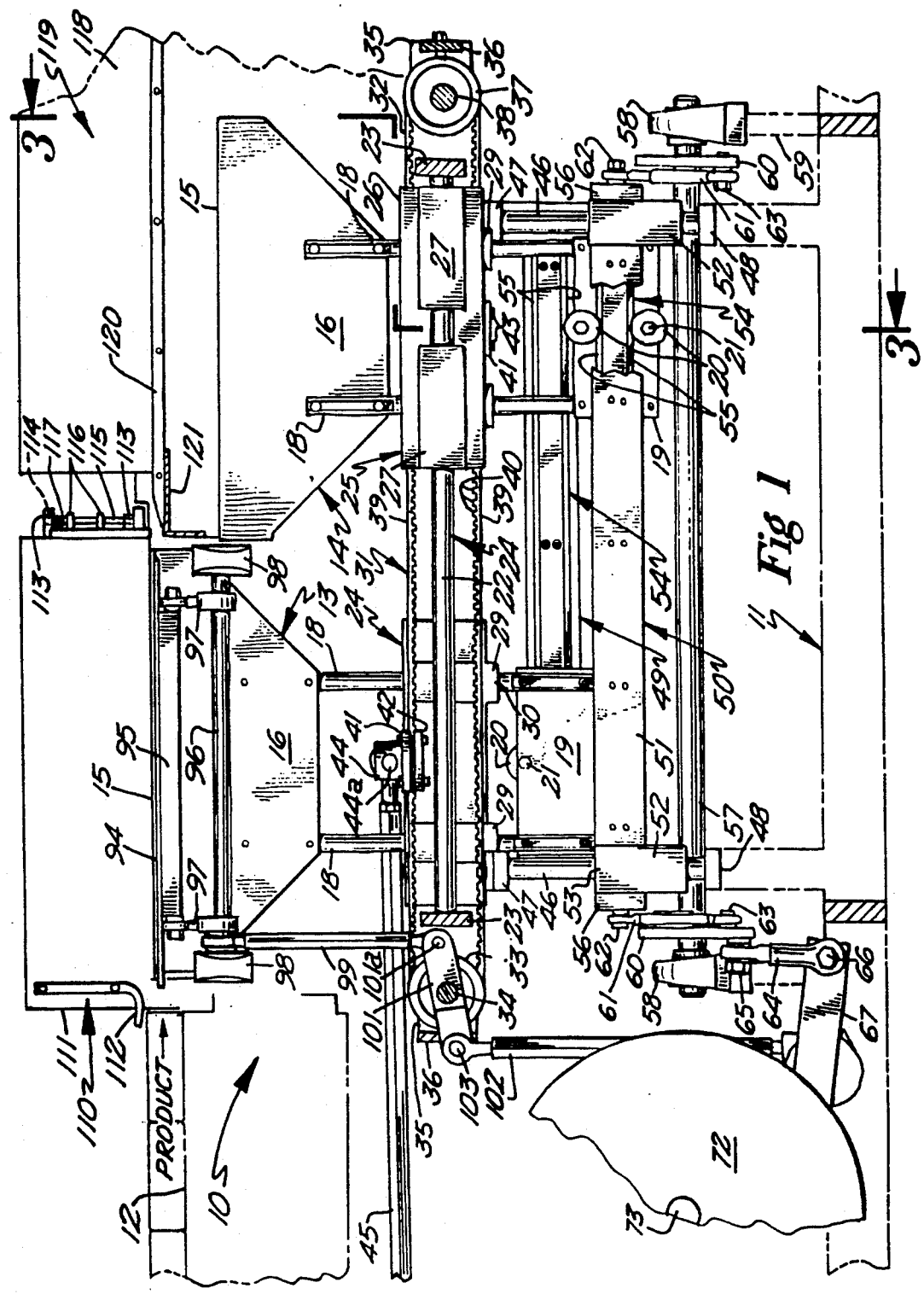

Referring now to the drawings, it will be seen that one embodiment of the novel stacker apparatus, designated generally by the reference numeral 10, is thereshown. The stacker apparatus 10 stacks product, usually cartons, in a stacking chamber for subsequent loading into cases at a downstream station. The cartons or boxes are continuously delivered to the stacker apparatus by a delivery conveyor 12. The stacker apparatus 10 includes a pair of stacking plate assemblies 13, 14 which are shiftably mounted on a support frame 11. It is pointed out that a substantial part of the support frame 11 has been omitted for clarity in order to better illustrate the various movable components of the apparatus.

The stacking plate assemblies 13, 14 are of substantially identical construction and each includes a flat horizontal rectangular upper plate 15 having a vertical side flange 16 integrally formed therewith and a vertical end flange 17 which is located at the upstream (front) end of the apparatus. It is pointed out that the upstream end of the stacker apparatus 10 is that end of the apparatus which receives product (cartons or boxes) from the delivery conveyor 12. The other end portion of the apparatus is the downstream end.

It will be noted that the vertical side flange 16 for each stacking plate assembly has a pair of rigid longitudinally spaced apart vertical posts 18 rigidly secured thereto and projecting downwardly therefrom. The lower end portions of each pair of vertical posts 18 are rigidly secured to a generally rectangular shaped flat carriage support plate 19. Each carriage support plate 19 has a pair of V-rollers 20 journaled thereon by axles 21. It will be noted that the V-rollers 20 are vertically spaced apart and each has a V-shaped circumferential recess therein.

Means are provided for shiftably mounting the stacking plate assemblies 13, 14 on the support frame 11 for horizontal reciprocating movement relative to the support frame. This means includes a pair of elongate horizontally disposed parallel laterally spaced apart guide bars 22 each extending between and being rigidly interconnected to a pair of intermediate transverse frame elements 23. The transverse frame elements 23 extend between and are rigidly secured to a pair of longitudinally extending frame elements 35 of the support frame 11.

The stacking plate assembly 13 coacts with a guide assembly 24 while the stacking plate assembly 14 coacts with a guide assembly 25 during horizontal reciprocation of the guide assemblies. Each guide assembly 24, 25 is of substantially identical construction and each includes a substantially rectangular shaped flat support plate 26 having a pair of longitudinally spaced apart generally rectangular shaped horizontal guide blocks 27 integrally formed therewith and projecting laterally outwardly therefrom. It will be noted that the horizontal guide blocks 27 project outwardly from the outer surface of each support plate 26.

Each support plate 26 also has a pair of longitudinally spaced apart vertical guide blocks 29 integrally formed therewith and projecting laterally inwardly from the inner vertical surface of the support plate. Each horizontal guide block 27 has an elongate longitudinally extending horizontal opening 28 therein while each vertical guide block 29 has an elongate vertically extending guide opening 30 therein. It will be noted that the horizontal guide openings 28 in the horizontal guide blocks for each guide assembly are disposed in longitudinal alignment with each other and each receives one of the guide bars 22 therethrough. The vertical post 18 for each stacking plate assembly projects through the vertical guide openings 30 in the vertical guide blocks of the associated guide assembly.

Means are provided for longitudinally reciprocating the stacking plate assemblies 13, 14 and this means includes a timing gear belt assembly 31. The timing gear belt assembly 31 is comprised of an endless timing gear belt 32 which is trained about an upstream idler sprocket 33 journaled on an axle 34 that is journaled in pillow bearings on longitudinal frame elements 35. The gear belt 32 is also trained about a downstream idler sprocket 37 which is journaled on an axle 38 that extends between and is journaled in suitable pillow bearings on the longitudinal frame elements 35 of the support frame 11 . The gear belt 32 has a smooth outer surface 39 and has a serrated inner surface which defines a plurality of teeth 40 that engage the upstream and downstream sprockets. It will be noted that the guide assembly 24 for the stacking plate assembly 13 is positioned on one side of the gear belt 32 while the guide assembly 25 for the stacking plate assembly 14 is positioned on the other side of the gear belt.

The guide assemblies 24, 25 are secured to the gear belt 32 for movement therewith and each guide assembly is provided with an inwardly projecting fixed clamping plate 41 which is rigidly affixed to the rectangular support plate 26 intermediate the ends thereof. Each fixed mounting plate 41 is secured to a movable clamping plate 42 by means of nut and bolt assemblies 43. It will be noted that the guide assembly 24 for the stacking plate assembly 13 is secured to the upper run of the gear belt 32 while the guide assembly 25 for the stacking plate assembly 14 is secured to the lower run of the gear belt.

It will also be noted that the support plate 26 for the guide assembly 24 has an ear 44 integrally formed therewith intermediate the ends thereof as best seen in FIG. 1. One end of an elongate motion transmitting link 45 is connected to the ear 44 of the guide assembly 24 by a pivot 44a. The motion transmitting link 45 is operatively connected via linkage to a rotary box cam which longitudinally reciprocates link 45 in a manner to be more fully described hereinbelow. Longitudinal reciprocation of link 45 transmits a fore and aft motion to the gear belt. Since the stacking plate assembly 13 is connected to the top run of the gear belt and since the stacking plate assembly 14 is connected to the bottom run of the gear belt, reciprocating motion of the motion transmitting link 45 will cause horizontal reciprocation of the stacking plate assemblies in opposite directions. Thus when the stacking plate assembly 13 is shifted horizontally in a downstream direction, the stacking plate assembly 14 will be simultaneously shifted in an upstream direction.

During operation of the stacker apparatus 10, the stacking plate assemblies 13, 14 are also reciprocated in a vertical direction between an elevated position and a lowered position. It will be seen that two sets of vertical guides are mounted on the support frame 11 and each set includes a pair of longitudinally spaced apart, parallel vertical rods 46. Each guide rod 46 is rigidly connected to an upper mounting bracket 47 and to a lower mounting bracket 48. The guide rods 46 are located below the horizontal plane of the lower run of the gear belt 32. These guide rods 46 are also located on opposite sides of the gear belt and one set is engaged by a horizontally disposed elongate track assembly 50 and the other set of the vertical guides 46 is engaged by a horizontally disposed track assembly 50 identical in construction to track assembly 49. In the embodiment shown, the track assembly 49 is operatively connected with the stacking plate assembly 13 while the track assembly 50 is operatively connected with the stacking plate assembly 14.

Each track assembly includes an elongate rectangular mounting plate 51 which is vertically oriented and which has a pair of vertical guide blocks 52 rigidly affixed to opposite ends thereof. Each vertical guide block has a vertical opening 53 therein for accommodating one of the guide rods 46 therethrough. Each of the track assemblies also is provided with an elongate horizontal track 54 rigidly secured thereto and projecting inwardly therefrom. The upper and lower longitudinal edges of each track 54 define knife edges 55 which are engaged by the V-rollers 20 on each support carriage 19. Each vertical guide block 52 has a mounting block 56 thereon.

The coaction of the V-rollers with the associated track 54 allows the stacking plate assemblies to move longitudinally relative to the associated track assembly. With this arrangement, the stacking plate assemblies 13, 14 are shiftable longitudinally relative to the track assembly 49, 50 between an upstream position and a downstream position.

Means are provided for vertically reciprocating the track assemblies 49, 50 and the stacking plate assemblies 13, 14 operatively connected therewith between the lowered position and the elevated position. This means includes an elongate horizontal rock shaft 57 which extends between and is journaled in pair of longitudinally spaced apart pillow bearings 58 mounted on suitable frame elements 59 of the support frame 11. A pair of elongate toggle arms 60 are secured to opposite ends of the rock shaft 57 for movement therewith.

Each mounting block 56 of each track assembly has one end of an elongate logitudinally adjustable toggle link pivotally connected thereto by pivot 62. The other end of each of the toggle links 61 is pivotally connected by pivot 63 to one end portion of one of the elongate toggle arms 60. Thus the pair of links connected to each toggle arm 60 are connected to the track assemblies 49, 50. In this regard, it will be noted that when the track assembly 49 is being elevated, track assembly 50 will be lowered. By vertically shifting the track assemblies 49, 50, the stacking plate assemblies 13, 14 which are operatively connected to the track assemblies will accordingly be vertically reciprocated.

One end of an elongate longitudinally adjustable link 64 is affixed to one end of the toggle arm 60 located at the upstream end of the rock shaft 57. The other end portion of the link 64 is pivotally connected to one end of an elongate cam arm 67. The other end of the cam arm 67 is mounted on the shaft 68 which is journaled in suitable bearings 69 secured to a suitable frame element of the support frame 11. The cam arm 67 is provided with a cam follower roller 70 which is journaled on the cam arm intermediate the ends thereof. The cam follower roller 70 engages an annular cam track 71 in a rotary box cam 72. The box cam 72 is keyed to a box cam shaft 73, which is journaled in suitable pillow bearing 73a mounted on the support frame 11. It will be seen that rotation of the rotary box cam 72 causes pivoting movement of the cam arm 75 by coaction of the cam follower roller with the cam track. This movement of the cam arm 75 is transmitted to the upstream rocker arm 60 and to the rock shaft 57 to cause vertical reciprocating movement of the track assemblies and the stacking plate assemblies associated therewith.

Referring again to FIGS. 3 and 4 it will be seen that a rotary box cam 74 is keyed to the cam shaft 73 but is axially spaced from the rotary box cam 67 and 106. An elongate cam arm 75 has one end thereof connected to a shaft 76 which is journaled in suitable pillow bearings 77 mounted on the support frame 11. It will be noted that the shaft 76 is disposed in parallel relation with respect to the cam shaft 73. The cam arm 75 is provided with an ear 78a intermediate the ends thereof and the ear has a cam follower roller 78 journaled thereon. The cam follower roller 78 engages an annular cam track 79 on the rotary box cam 74 to cause pivoting movement of the cam arm in response to rotation of the box cam 74.

One end of an elongate link 80 is pivotally connected to the upper end of the cam arm 75 by pivot 81. The other end of the link 80 is pivotally connected to an ear 83 on a elongate arm 84 by pivot 82. It will be noted that a pivotal connection between the link 80 and the arm 84 is located intermediate the ends of the arm 84. The lower end portion of the arm 84 is mounted on the pivot shaft 85 journaled in suitable pillow bearings 87 mounted on the support frame 11. The upper end portion of the arm 84 is pivotally connected to the front or upstream end of the motion transmitting link 45 by pivot 86.

It will be seen that when the cam arm 75 is pivoted in response to the coaction of the cam follower roller 78 with the cam track 79, this motion will be transmitted to the motion transmitting link 45 via the link 80 and arm 84 which causes horizontal reciprocation of the gear belt and the stacking plate assemblies. It will further be noted that the cam arm 75, link 80, arm 84 and motion transmitting link 45 define parallelogram linkage.

Suitable drive means is provided for driving the cam shaft 73 and this means includes a an electric motor 88 mounted on the support frame 11 and having a gear reduction mechanism 89. The output shaft 90 of the gear reduction mechanism has a drive sprocket 91 keyed thereto for rotation therewith. A driven sprocket 92 is secured to an overload device 92a which is mounted on the cam shaft 73. An endless drive chain 93 is trained about the sprockets 91, 92 so that when the electric motor 88 is energized, the cam shaft 73 will be driven through the sprocket chain drive to thereby rotate box cam 72 and the box cam 74. The overload device 92a is manufactured by Ferguson Manufacturing Co., and is operable when subjected to a predetermined torque load to slip relative to the cam shaft 73.

Figure 2:
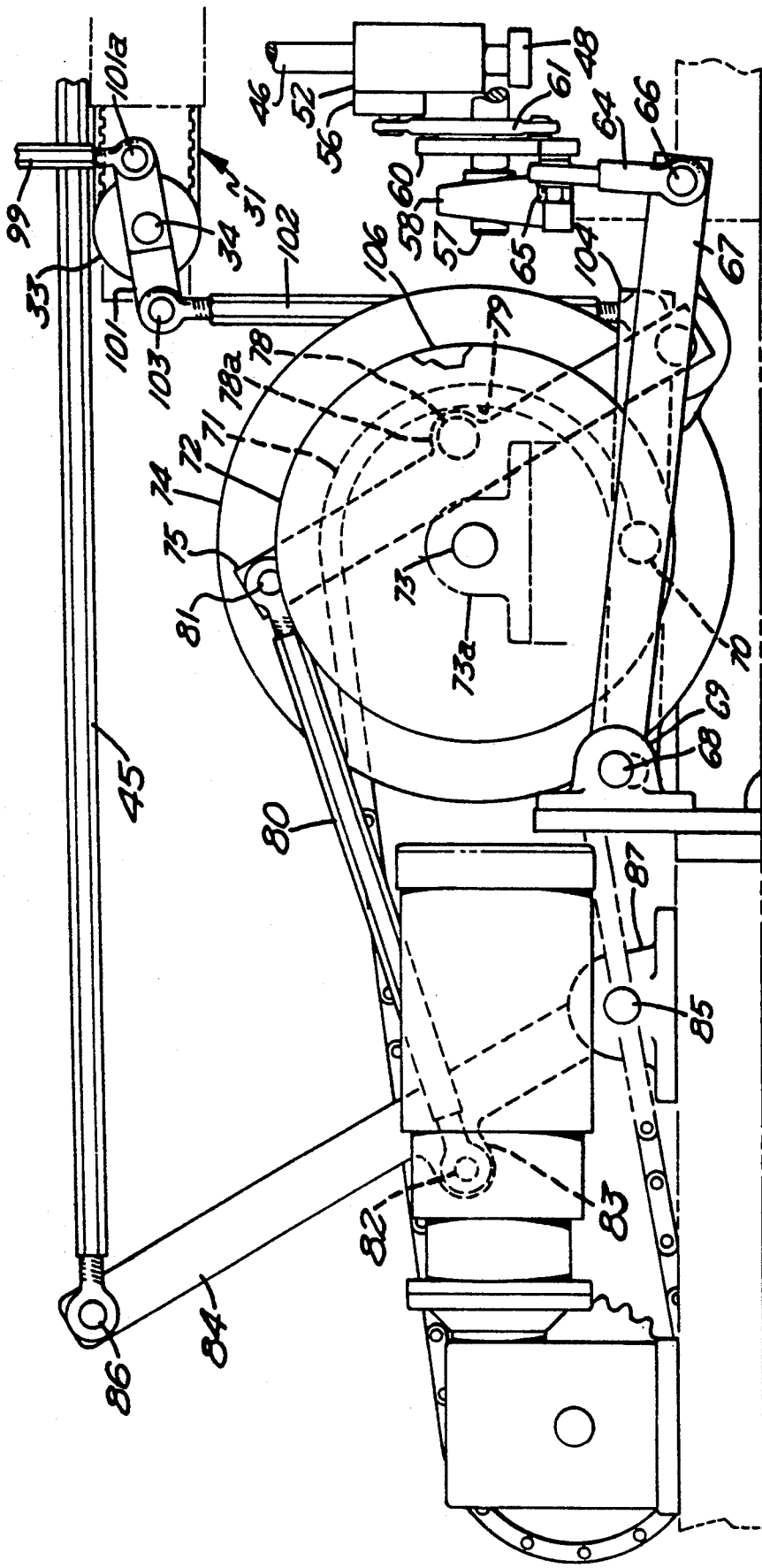

Referring again to FIGS. 1 and 2, it will be seen that the stacker apparatus 10 is provided with a stacking chamber 110 located between a pair of vertically disposed longitudinally extending vertically disposed side plates 111 which are secured to the support frame 11. It will be noted that the stacking chamber 110 is located adjacent the discharge end of the delivery conveyor and extends upwardly beyond the horizontal plane of the upper surface of a stacking plate assembly when the latter is an the elevated position.

Each of the vertical plates 111 has an elongate horizontal, longitudinally extending track element 111a secured to the lower end portion thereof and projecting inwardly therefrom. These track elements 111a are disposed in substantially the same horizontal plane as the upper run of the delivery conveyor 12. The spacing between the track elements 111a is sufficient to permit upward passage of the stacking plate assemblies therebetween. The track elements 111a support the product to be stacked which is delivered to the stacking chamber by the delivery conveyor.

Means are provided for engaging the lower-most horizontal row of vertically stacked cartons in the stacking chamber when a stacking plate assembly is longitudinally shifted downstream from the upstream position. This means includes a pair of elongate rectangular shaped, longitudinally extending catch plates 94 which are mounted for shifting movement between a supporting position and a retracted position.

Each catch plate 94 has an elongate mounting block 95 rigidly secured to the lower surface thereof and projecting downwardly therefrom. An elongate horizontally disposed rock shaft 96 is journaled at opposite ends in pillow bearings 98 and is provided at opposite ends thereof with an L-shaped crank arm 97. A pair of crank arms 97 are secured to the ends of a mounting block 95 of one of the catch plates 94. The crank arms 97 for each rock shaft are keyed to the rock shaft for movement therewith. The upper ends of elongate vertically disposed links 99 are pivotally connected to the upstream crank arms 97 by pivots 100. The lower end of each link 99 is pivotally connected to one end of an elongate rocker arm 101 by pivot 101a. It will be noted that the rocker arm 101 is affixed to the shaft 34 which journals the upstream idler sprocket 33.

Figure 4:
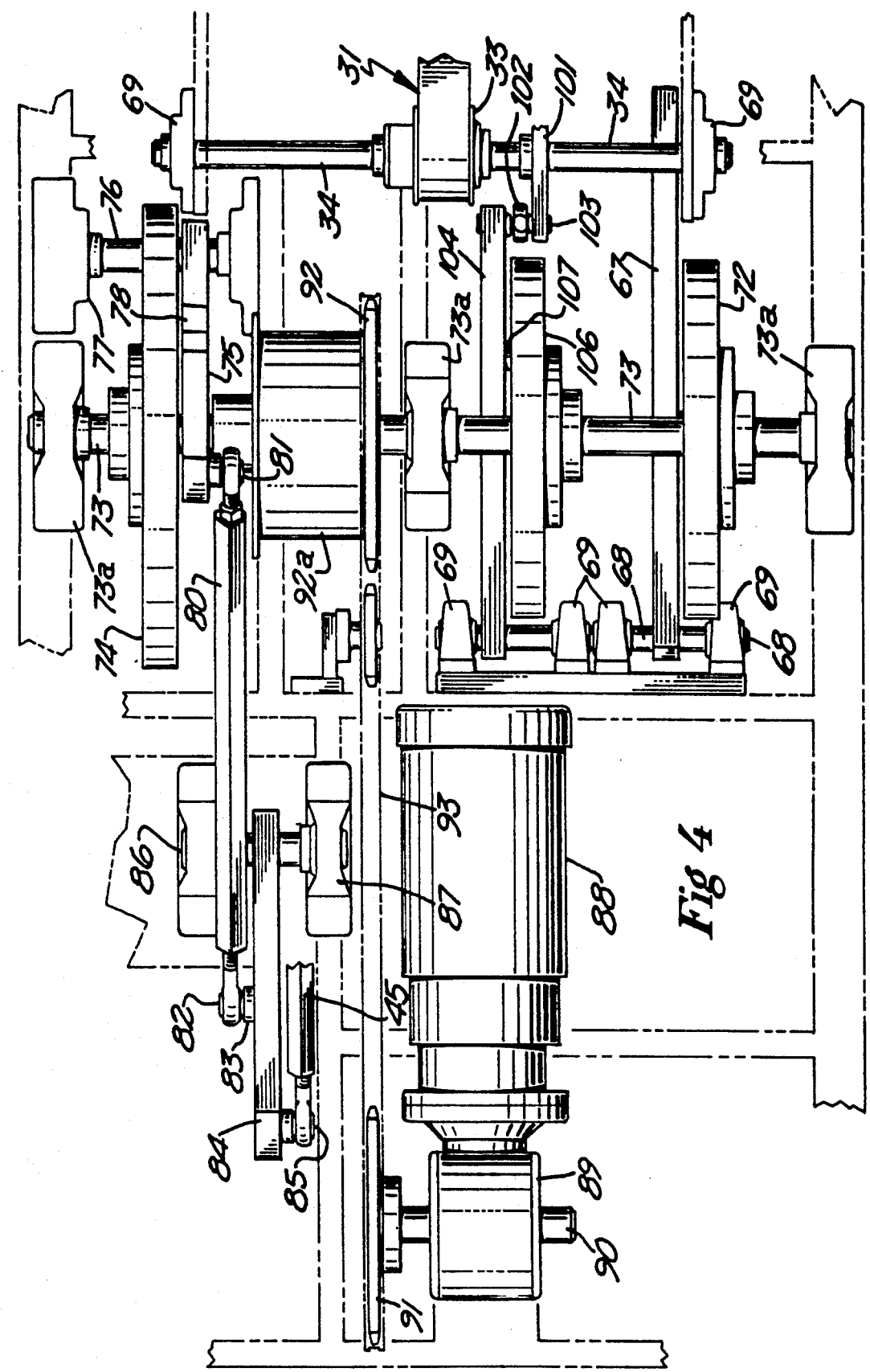

The upper end of an elongate link 102 is pivotally connected to the other end of the rocker arm 101 by pivot 103. The lower end portion of the vertically disposed link 102 is pivotally connected to one end of an elongate cam arm 104 by means of a pivot 105. The other end of the cam arm 104 is journaled in the shaft 68 as best seen in FIG. 4. A rotary box cam 106 is keyed to the cam shaft 73 and is located between the box cam 72 and the box cam 74. The cam arm 104 is provided with a cam follower roller 107 which is journaled thereon intermediate the ends of the cam arm 104. The cam follower roller engages in an annular cam track on the rotary box 106 cam in the manner of the cam follower rollers associated with the rotary box cams 72, 74. It will be seen that when the rotary box cam 106 is revolved, this rotary motion will be transmitted via the cam arm 104, link 102, rocker arm 101, link 99 to the L-shaped crank arms 97. The movement of this linkage produces pivoting movement of the catch plates between a horizontal supporting position and the retracted position.

It will be noted, that when the catch plates 94 are in the supporting position, these catch plates will underlie the lowermost horizontal row of product to support all of the product stacked vertically in the stacking chamber 110 above the incoming row of product to be stacked. The catch plates are retracted when a stacking plate assembly is shifted vertically to engage and support receive a horizontal row of product delivered by the delivery conveyor. The catch plates are thereafter shifted to the horizontal product supporting position when a stacking plate assembly begins its horizontal movement in a downstream direction.

The stacking chamber 110 is provided with hold down means for holding the product delivered by the delivery conveyor in a horizontal position as product is moved upon the track elements 111a by the conveyor. This means includes a pair of elongate vertically extending hold down elements 112 which are secured to the plates 111 adjacent to the upstream end thereof. It will be noted that the lower ends of the hold down elements 112 are bent in an upstream direction. As the product is successively delivered to the stacking chamber, the product is held against upward buckling movement by hold down elements 112 so that the product is maintained in a horizontal row as the product is supported on the track elements 111a.

Means are also provided for yieldably retaining a product stack in the stacking chamber and this means includes a pair of vertically spaced apart brackets 113 which are secured to each of the plates 111 adjacent the downstream end thereof. Each of the brackets 113 has a bearing element 114 rigidly secured thereto. A vertical pivot shaft 115 is journaled in the bearing elements 114 and has a stop element 116 affixed thereto to permit fore and aft swinging movement of the stop element 116 about a vertical axis. Each stop element 116 is biased to an obstructing position by a spring 117. The pair of stop elements are disposed obstructing relation with respect to the product stack in the stacking chamber 110. When a predetermined number of cartons have been stacked in the stacking chamber, the stacked product may be pushed downstream by a pusher device (not shown) to overcome the bias of the spring for delivery of the stacked product into a case.

A pair of laterally spaced apart longitudinally extending vertical plates 118 are mounted on the support frame 11 and define a discharge station 119 located downstream of the stacking chamber 110. Each plate 118 has an elongate, longitudinally extending horizontal track element 120 affixed thereto adjacent to the lower portion thereof. When the stacked product in the stacking chamber 110 is pushed in a downstream direction by a pusher device (not shown), then the stacked product slides along the track elements 120. An elongate, L-shaped stop bar 121 is rigidly secured to the upstream ends of the track elements 120. The stop bar 121 is disposed in obstructing relation with respect to the row of product supported on the track elements 111a of the stacking chamber 110. Thus the stop bar 121 limits downstream movement of the product as it is fed by the conveyor 12 into the stacking chamber 110.

Figure 3:
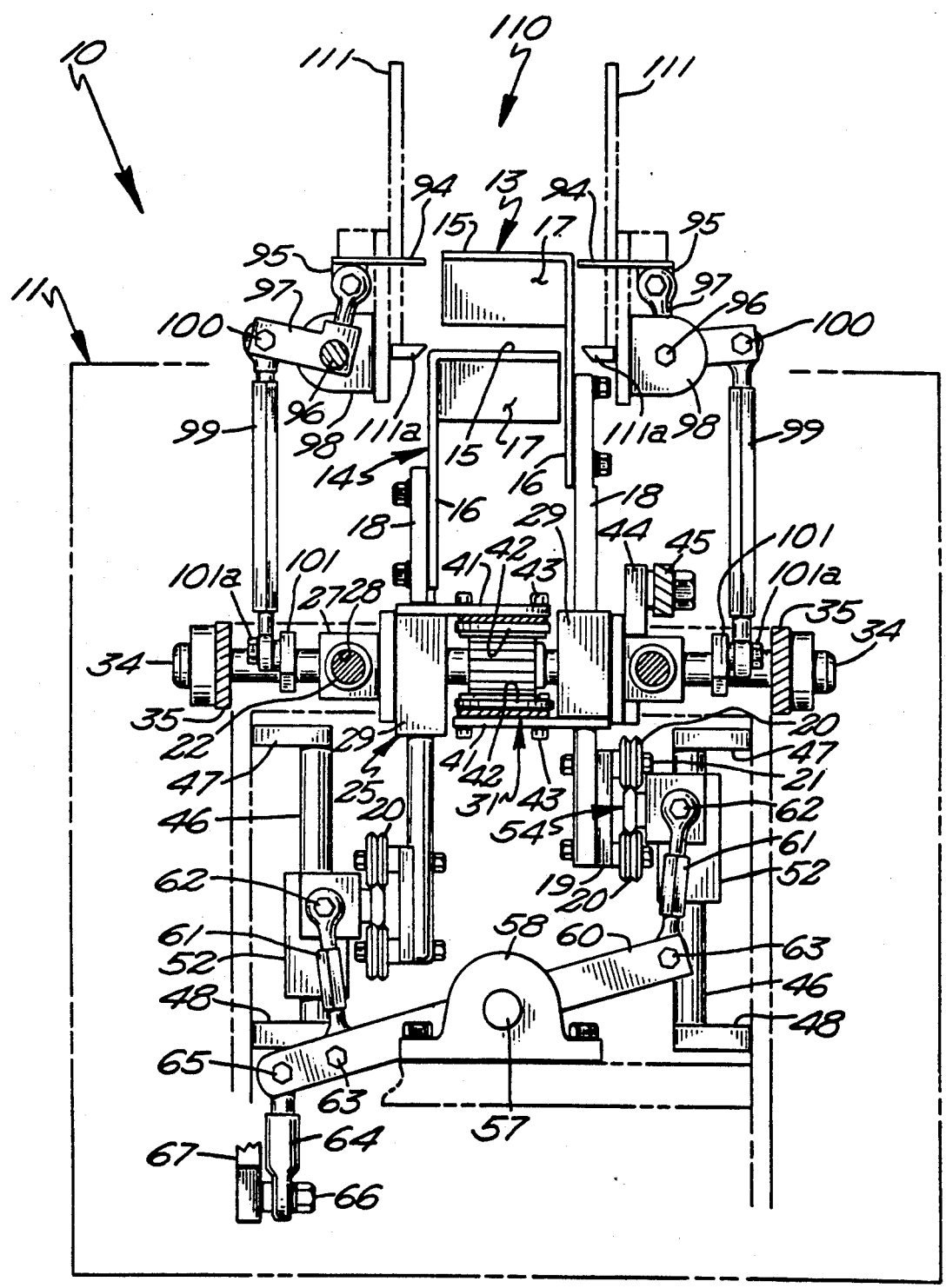

It will also be noted that when the catch plates 94 are in the supporting position, the lateral spacing between the inner edges thereof corresponds to the lateral spacing between the track elements 111a as best seen in FIG. 3. The stacking plate assemblies will therefore be able to pass between the plates during the stacking operation. However, it will be noted that the product (boxes) has a width dimension which allows the product to be supported on the track elements 111a and to be supported in stacked fashion on the catch plates.

During operation of the stacker apparatus 10, product is continuously fed into the stacking chamber 110 by the conveyor 12. The product is supported on the track elements 111a as the product is moved into the stacking chamber. For purposes of illustration, four cartons (packages) are moved into the stacking chamber to form a horizontal row to be successively stacked for delivery to the downstream discharge station and into a packaging case.

The electric motor 88 will be energized to drive the cam shaft 73 through the chain and sprocket drive. The rotary box cam 74 will be revolved to longitudinally reciprocate the stacking plate assemblies 13, 14 through the parallelogram linkage (arm 75, link 80, arm 84,, link 45) and gear belt 32.

The rotary box cam 72 will be simultaneously revolved to vertically reciprocate the stacking plate assemblies 13, 14 via the cam arm 67, links 64, toggle arms 60, toggle links 61, and track assemblies 49, 50. The horizontal reciprocating movement of the stacking plate assemblies is that of action and a corresponding opposite reaction. Thus, when one stacking plate assembly is moving in an upstream direction, the other stacking plate assembly will be moving in a downstream direction. The same is true with respect to vertical reciprocating movement of the stacking plate assemblies. When one stacking plate assembly is ascending, the other stacking plate assembly will be descending.

Finally, the rotary box cam 106 will be revolved along with the rotary box cams 72, 74 to shift the catch plates 94 between supporting and retracted positions through the cam arm 104, links 102, arms 101, links 99, and crank arms 97. The horizontal and vertical reciprocating movements of the stacking plate assemblies are synchronized so that the continuous overall movement of the stacking plate assemblies defines an ellipse.

In this regard, when each stacking plate assembly is shifted longitudinally in an upstream direction, the stacking plate assembly will also be in a lowered position. As each stacking plate assembly is being moved upstream, it will begin its ascent before completing its horizontal component of movement. Similarly, when moving downstream, each stacking plate assembly will begin its descent before it has completed its horizontal component of movement. This is the elliptical pattern defined by the stacking plate assemblies in their path of travel during the stacking operation.

The catch plates 94 are retracted during the terminal part of the upward stroke of each stacking plate assembly to permit each successive row of product to be upstacked in the stacking chamber. The catch plates 94 are shifted to the support position as the stacking plate assembly is being shifted in a downstream direction. The catch plates 94 will then support the stacked product in stacking chamber 110.

Since all of the rotary box cams which produce the various movements of the stacking plate assemblies and catch plate, are keyed to a single driver cam shaft, synchronization of these movements, is for the most part, a function of the design of the rotary box cams including the configuration of the annular cam grooves.

The product to be stacked must be dimensionally stable and is typically in the form of boxes or trays. The product is continuously delivered to the stacking chamber 110 by the delivery conveyor 12, and, in the embodiment shown, four boxes are delivered for stacking. However, the number and size of the product to be stacked in the upstacking stroke may obviously vary. The horizontal component of movement of each stacking chamber assembly is generally defined as the product stroke, and corresponds to the length dimension of the product row (for example four boxes) to be stacked.

For the purposes of description, the box supported in the stacking chamber next adjacent the delivery conveyor will be designated box number four. The box on the delivery conveyor which engages and is next adjacent box number four will be designated box number five.

The product to be stacked will be moved into the stacking chamber 110 and will be supported on the tracks 111a. As each stacking plate assembly is moved upstream, it will begin its ascent before reaching the end of its upstream stroke and will therefore define a curved path of movement. Each stacking plate assembly during its upward movement will engage the lower surfaces of the product (boxes) before it (stacking plate assembly) has completed its upstream travel.

Each stacking plate assembly will begin lifting the boxes in the stacking chamber before the stacking plate assembly has reached the end of its upstream movement. However, as the row of boxes is lifted, box number four will remain in contact with box number five until the stacking plate assembly has substantially completed its upstream movement. At that time the lip or vertical flange 17 of the stacking plate assembly will engage the front surface of box number five.

The boxes on the conveyor will be held back by continued contact between box number four and box number five until box number five is engaged by the vertical flange 17 which then takes over the horizontal surge exerted by the boxes on the conveyor. Although the time and distance of travel of each stacking plate assembly between initial product lifting and of engagement box number five by the vertical flange 17 is relatively small (of the order of ¼ inch), this arrangement obviates the need for a definite shear point as required in prior art stacking machines.

Figure 5:
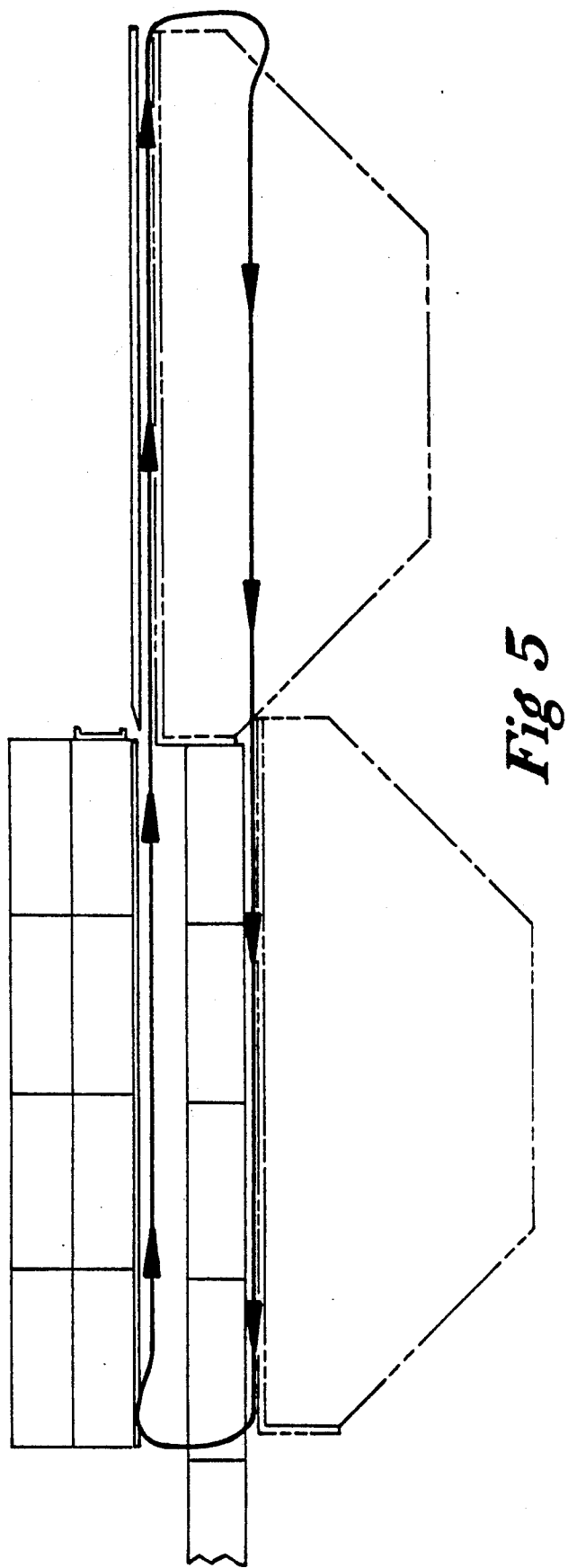

The elliptical path of movement of the stacking plate assemblies is diagrammatically but clearly illustrated in FIG. 5. It will be noted that each stacking plate assembly continues its final increment of ascent even though it (stacking plate assembly) is now being shifted in a downstream direction.

Each stacking plate assembly reaches its maximum acceleration during approximately one half stroke (distance) in a downstream direction. Thereafter, each stacking plate assembly is steadily decelerated until it begins to descend while continuing its downstream movement to its downstream position.

The acceleration and deceleration of the stacking plates is a function of the design and configuration of the rotary box cams 72, 74 and 106. As pointed out above all of the movements and motions of the stacking plates is a function of the design of the rotary box cams including the configuration of the annular cam grooves.

The vertical dimension of the flange 17 of each stacking plate assembly is of a magnitude so that the flange 17 remains in contact with the product during substantially its (stacking plate assembly) entire downstream stroke (products stroke). Since the initial increment of movement of each stacking plate assembly in a downstream direction is during the period of greatest acceleration, and since the terminal increment of movement in the downstream direction occurs while each stacking plate assembly is being steadily decelerated, the product is also accelerated and decelerated as it is introduced into the stacking chamber. This operational feature of the apparatus allows the upstream product surge pressure to occur while the stacking plate assembly is first accelerated and then decelerated. Thus, the product surge pressure is progressively dampened as the product moves into the stacking chamber. This dampening effect of the surge pressure minimizes damage to the product during the stacking operation. The timing sequence of the stacking plate assemblies is predetermined so that product introduced into the stacking chamber is lifted before the row of product is stopped by the stop bar 121.

Referring again to FIG. 5, it will be noted that there is a small asymmetrical deviation in the path of travel of the stacking plate assemblies at end portion of the elliptical pattern. This small deviation shifts each stacking plate assembly downwardly away from the product supported thereon after the catch plates 94 have been moved into supporting relation with the product. This pattern of movement allows each stacking plate assembly to be quickly moved away from stacked product supported on the catch plates to thereby prevent any damage to the product as a result of the stacking plate assemblies sliding across the lower surface of the product.

It is pointed out that the continuous reciprocating path of travel of the stacking plates assemblies is that of a walking beam. The operation is truly continuous and the stacking apparatus may be operated at high speeds in an efficient manner. The successive engagement by the stacking plate assemblies of the product fed into the stacking chamber allows the product surge to be dampened and product to be smoothly moved into the stacking chamber.

The manner in which the product is initially raised by a stacking plate assembly before the stacking plate assembly engages and absorbs the upstream product surge presure obviates the need for a definite shear point.

It will therefore be seen that I have provided a novel continuously operable stacker apparatus which is of simple design, requires no pre-loading, is easy to maintain and clean, and is gentle with the product during operation of the apparatus.

Thus, it will be seen that I have provided an novel stacker apparatus, which is not only of simple construction and operation, but one which functions in a more efficient manner than any heretofore known comparable stacker apparatus.

What is claimed is:

1. A stacker apparatus for continuously stacking dimensionally stable product delivered to the stacker apparatus by a conveyor, comprising:
   a support frame;
   means on said support frame defining a stacking chamber including product support elements adjacent the conveyor for receiving and supporting a horizontal row of product to be stacked from the conveyor;

a stacking plate assembly have a horizontal upper product engaging surface for supporting product to be stacked thereon;

means mounting said stacking plate assembly on said frame to permit shifting movement of said stacking plate assembly between an upstream position adjacent the conveyor and a downstream position;

means mounting said stacking plate assembly on said frame to permit vertical shifting movement of said stacking plate assembly between an elevated position and a lower position;

drive means operatively connected with said stacking plate assembly for continuously shifting the stacking plate assembly through an elliptical path of travel, said stacking plate assembly during said travel moving in an upstream direction, then upwardly into supporting relation with product in the stacking chamber to move the product upwardly to form a vertical stack in the stacking chamber prior to completion of the upstream movement, said stacking plate assembly thereafter being moved in a downstream direction while engaging product being fed into the stacking chamber by the conveyor to thereby absorb product surge pressure exerted by incoming product, said stacking plate assembly then being moved downwardly to the lower position to then continue movement in an upstream direction;

and shiftable product support means on said support frame for supporting product in vertically stacked relation delivered by the stacking plate assembly during its upward shifting movement.

2. A stacker apparatus for continuously stacking dimensionally stable product delivered to the stacker apparatus by a conveyor comprising;

a support frame;

a stacking chamber on said support frame adjacent the conveyor and having a pair of product support elements for supporting a horizontal row of product delivered by the conveyor;

a pair similar stacking plate assemblies each having an upper surface for supporting a row of product thereon, each stacking plate assembly having a front end portion for engaging product being fed into the stacking chamber by the conveyor;

means mounting each of said stacking plate assemblies on said support frame to permit shifting movement thereof between upstream and downstream positions;

means mounting each of said stacking plate assemblies on said support frame to permit vertical shifting movement between elevated and lowered positions;

and drive means operatively connected with said stacking plate assemblies for continuously and successively reciprocating said stacking plate assemblies through an elliptical path of travel, each stacking plate assembly during said travel being moved in an upstream direction then upwardly into supporting relation to the product on the support elements in the stacking chamber before reaching the upstream position, each stacking plate then being moved in a downstream direction while engaging product being fed into the stacking chamber with its front end portion whereby product surge pressure is absorbed by each stacking plate assembly as it is moved in a downstream direction, each stacking plate assembly continuing its path of movement to its downstream position and thereafter being shifted downwardly to a lowered position to then continue movement in an upstream direction;

and stack support means shiftably mounted on said support frame for supporting product in a vertical stack which is continuously delivered upwardly by the stacking plate assemblies.

3. A stacker apparatus for continuously stacking dimensionally stable product delivered to the stacker apparatus by a conveyor comprising;

a support frame;

a stacking chamber on said support frame adjacent the conveyor and having a pair of product support elements for supporting a horizontal row of product delivered by the conveyor;

a pair similar stacking plate assemblies each having an upper surface for supporting a row of product thereon, each stacking plate assembly having a front end portion for engaging product being fed into the stacking chamber by the conveyor;

first mounting means mounting each of said stacking plate assemblies on said support frame to permit shifting movement thereof between upstream and downstream positions;

second mounting means mounting each of said stacking plate assemblies on said support frame to permit vertical shifting movement between elevated and lowered positions;

first drive means operatively connected with said stacking plate assemblies for reciprocating said stacking plate assemblies between an upstream position adjacent the conveyor and a downstream position;

second drive means operatively connected with said stacking plate assemblies for vertically reciprocating said stacking plate assemblies between elevated and lowered positions, said first and second drive means being synchronized for continuously and successively reciprocating said stacking plate assemblies through an elliptical path of travel, each stacking plate assembly during said travel being moved in an upstream direction then upwardly into supporting relation to the product on the support elements in the stacking chamber before reaching the upstream position, each stacking plate then being moved in a downstream direction while engaging product being fed into the stacking chamber with its front end portion whereby product surge pressure is absorbed by each stacking plate assembly as it is moved in a downstream direction, each stacking plate assembly continuing its path of movement to its downstream position and thereafter being shifted downwardly to a lowered position to then continue movement in an upstream direction;

and stack support means shiftably mounted on said support frame of supporting product in a vertical stack which is continuously delivered upwardly by the stacking plate assemblies.

4. The stacker apparatus as defined in claim 3 wherein one of said stacking plate assemblies is shifted in an upstream direction simultaneously when the other stacking plate assembly is shifted in a downstream direction.

5. The stacker apparatus as defined in claim 4 wherein said first and second drive means includes a plurality of cam means operatively connected with each stacking plate assembly, said cam means of said first and second drive means being operable to cause each stacking plate assembly to be first accelerated and thereafter decelerated in its movement in a downstream direction to thereby accelerate and decelerate product being fed into the stacking chamber.

6. The stacker apparatus is defined in claim 3 wherein said first and second drive means each includes a rotary box cam, a cam follower, and linkage interconnecting said cam follower with a stacking plate assembly.

7. The stacker apparatus as defined in claim 6 wherein said rotary box cams are secured to a common rotatable shaft, and power means drivingly connected to said shaft for rotating the same.

8. The stacker apparatus as defined in claim 3 wherein said first drive means for reciprocating said stacking plate assemblies between said upstream and downstream positions includes a pair of spaced apart sprockets journaled on said support frame, an elongate horizontally disposed gear belt trained about said sprockets and being alternately shiftable in upstream and downstream directions.

9. The stacker apparatus as defined in claim 8 wherein said gear belt includes an upper run and a lower run, one of said stacking plate assemblies being secured to the upper run of the gear belt and the other stacking plate assembly being secured to the lower run of the gear belt.

10. The stacker apparatus as defined in claim 3 wherein said first mounting means include a pair of guide assemblies mounted on said support frame for horizontal reciprocating movement relative thereto, each guide assembly being connected to one of said stacking plate assemblies and being moveable therewith between upstream and downstream positions.

11. The stacker apparatus as defined in claim 3 wherein said second mounting means includes a pair of track assemblies each being mounted on said support frame for vertical reciprocating movement relative thereto, each track assembly being connected to one of stacking plate assemblies for vertical reciprocating movement therewith between elevated and lowered positions.

* * * * *